(12) United States Patent
Zwikker et al.

(10) Patent No.: US 7,617,740 B2
(45) Date of Patent: Nov. 17, 2009

(54) CORIOLIS MASS FLOWMETER WITH OPTICAL POSITION SENSORS

(75) Inventors: Jan Marinus Zwikker, Hengelo (NL); Aditya Mehendale, Ruurlo (NL); Wybren Jouwsma, Lochem (NL)

(73) Assignee: Berkin B.V., Ruurlo (NL)

( * ) Notice: Subject to any disclaimer, the term of this patent is extended or adjusted under 35 U.S.C. 154(b) by 38 days.

(21) Appl. No.: 11/984,253

(22) Filed: Nov. 15, 2007

(65) Prior Publication Data

US 2008/0115588 A1 May 22, 2008

(30) Foreign Application Priority Data

Nov. 16, 2006 (NL) .................................. 1032880

(51) Int. Cl.
*G01F 1/84* (2006.01)
(52) U.S. Cl. .............................. 73/861.355; 73/861.357
(58) Field of Classification Search ........................ None
See application file for complete search history.

(56) References Cited

U.S. PATENT DOCUMENTS

| | | | | |
|---|---|---|---|---|
| 4,243,883 A * | 1/1981 | Schwarzmann | ............. | 250/343 |
| RE31,450 E * | 11/1983 | Smith | ..................... | 73/861.356 |
| 4,801,897 A * | 1/1989 | Flecken | .................. | 73/861.357 |
| 4,852,410 A * | 8/1989 | Corwon et al. | ......... | 73/861.355 |
| 4,949,583 A * | 8/1990 | Lang et al. | ............. | 73/861.357 |
| 5,738,106 A * | 4/1998 | Yamamori et al. | .......... | 600/532 |
| 6,687,004 B1 * | 2/2004 | Shana et al. | ................. | 356/436 |
| 6,748,813 B1 * | 6/2004 | Barger et al. | ........... | 73/861.355 |
| 6,776,053 B2 * | 8/2004 | Schlosser et al. | ....... | 73/861.355 |
| 6,947,131 B2 * | 9/2005 | O'Mahony et al. | .......... | 356/218 |
| 7,168,329 B2 * | 1/2007 | Bell et al. | ............. | 73/861.355 |
| 7,230,687 B2 * | 6/2007 | O'Mahony et al. | ............ | 356/39 |
| 2003/0097881 A1 | 5/2003 | Schlosser et al. | | |
| 2005/0150311 A1 | 7/2005 | Berger et al. | | |
| 2006/0012774 A1 * | 1/2006 | O'Mahony et al. | ............ | 356/39 |
| 2006/0042402 A1 | 3/2006 | Bell et al. | | |

FOREIGN PATENT DOCUMENTS

| | | |
|---|---|---|
| DE | 42 26 391 A1 | 2/1994 |
| EP | 1 182 433 A2 | 2/2002 |
| EP | 1 719 982 A1 | 11/2006 |
| EP | 1 719 983 A1 | 11/2006 |

* cited by examiner

*Primary Examiner*—Harshad Patel
(74) *Attorney, Agent, or Firm*—Young & Thompson

(57) ABSTRACT

Coriolis mass flowmeter comprising a flow tube, at least one tube position sensor provided with a light source and with a light detector for receiving light from the light source, and drive means for causing the tube to move about an axis, the above being arranged such that the tube or a projection fastened to the tube, for example a vane, moves through a light path between the light source and the light detector, wherein a first screen with a first light-transmitting opening is placed at the side of the light source and a second screen with a second light-transmitting opening is placed at the side of the light detector, wherein the first and the second opening are identical and are correspondingly oriented, and wherein the openings are mutually parallel and aligned so as to form a prismatic light beam on the detector.

23 Claims, 12 Drawing Sheets

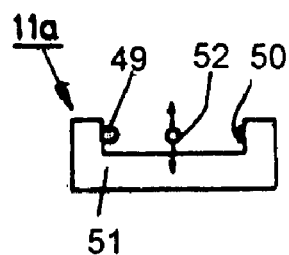
FIG. 4A
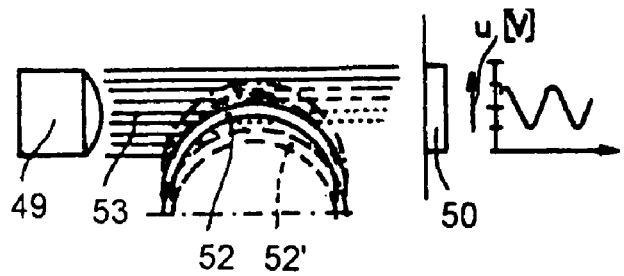
FIG. 4B
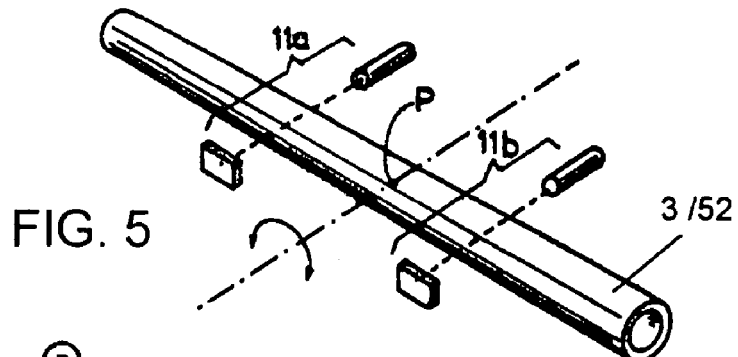
FIG. 5
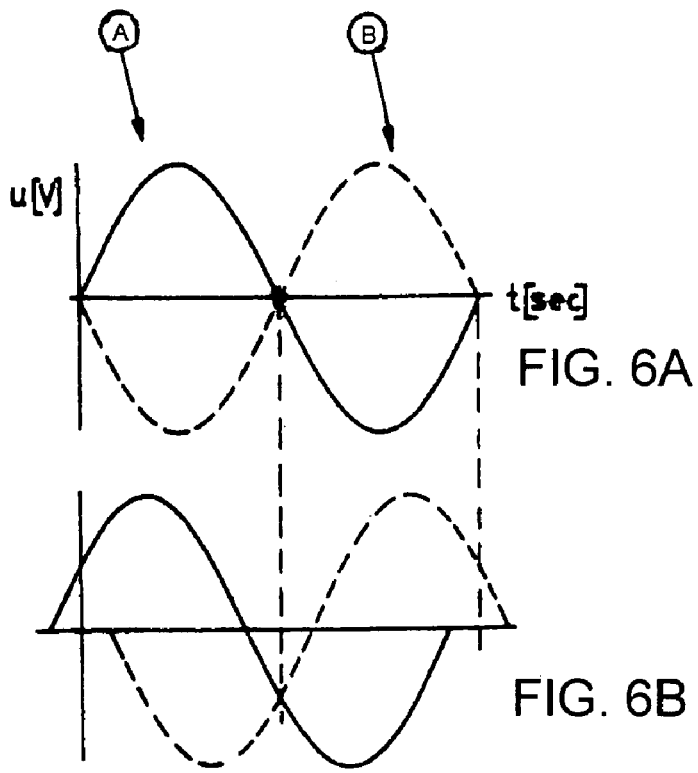
FIG. 6A
FIG. 6B

FIG. 24
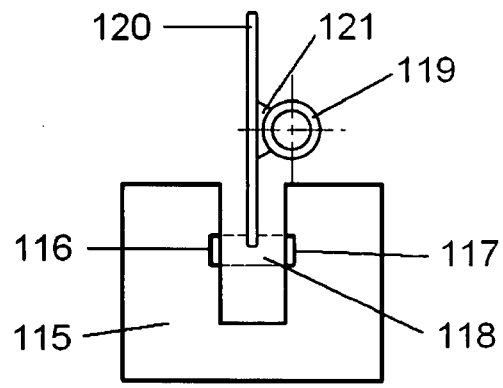
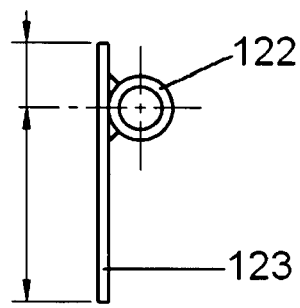
FIG. 25
FIG. 26
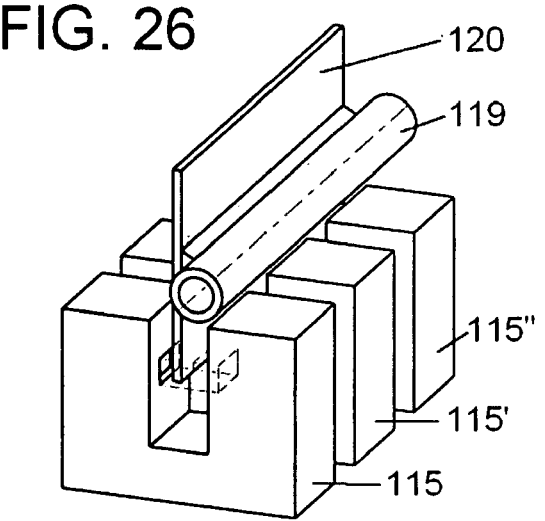

CORIOLIS MASS FLOWMETER WITH OPTICAL POSITION SENSORS

The invention relates to a Coriolis mass flowmeter comprising a flow tube, at least one tube position sensor provided with a light source and with a light detector for receiving light from the light source, and drive means for causing the tube to move about an axis, the above being arranged such that the light detector provides a signal in response to a displacement of the tube relative to a light path between the light source and the light detector.

Such a mass flowmeter is known from DE 4 226 391. The Coriolis mass flowmeter known therefrom comprises an optical tube position sensor with a light source, in front of which a large lens is arranged, and a light detector. The tube, which moves transversely to the light beam, is in the path of the light between the light source and the light detector and, depending on it instantaneous position, screens off a larger or smaller portion of the light beam that is incident on the detector. The measuring accuracy of this construction is found to be less than optimal in practice, while in addition the known Coriolis mass flowmeter cannot be given very small dimensions.

The Coriolis mass flowmeter according to the invention solves this problem and provides a mass flowmeter of the kind mentioned in the opening paragraph which is characterized in that the light source and the light detector are positioned right opposite one another at a predetermined distance from one another and are separated by an intervening space in which the tube or a projection fastened to the tube, such as a vane or a hollow or solid, dummy tube, can move with clearance, wherein a first screen with a first light-transmitting opening is placed at the side of the light source and a second screen with a second light-transmitting opening is placed at the side of the light detector, wherein the first and the second opening are identical and are correspondingly oriented, and wherein the openings are mutually parallel and aligned (i.e. the optical axes of the first and the second opening coincide).

The Coriolis mass flowmeter according to the invention can be given a very compact construction. The light source and the light detector are located at a predetermined distance right opposite one another, separated by an intervening space that is so dimensioned that the tube or a projection fastened to the tube can move therein with clearance.

A first embodiment involves the use of a PCB as a carrier on which a light source and a light detector are mounted opposite one another at a predetermined, small distance from one another. The screens with the light-transmitting openings ("windows") are arranged on the PCB between the light source and the light detector. A further embodiment advantageously utilizes an optical micromodule. The latter is formed by a so-termed photo-microsensor: a U-shaped housing having two legs in one of which a light source (for example an LED or a laser diode) and in the other one of which a light detector (for example a phototransistor) is present. The optical axes of the light source and the light detector are mutually matched, so that the light from the light source directly hits the light detector.

In the Coriolis meter according to the invention, a first screen with a first light-transmitting opening is placed at the side of the light source and a second screen with a second light-transmitting opening is placed at the side of the light detector in the light path such that the optical axes of the first and second screens coincide. The openings are identical and oriented in the same manner.

It is achieved thereby that the light detector detects only the displacement of the tube or of the projection fastened to the tube in a prismatic partial beam between the first and the second light-transmitting opening. The signal generated by the light detector is thus only dependent on displacements of the tube, or of the projection fastened to the tube, transverse to the light beam, and not also dependent on displacements of the tube in the direction along the light beam.

The screens with the openings may be formed by the walls of the housing, or they may be formed by plates with openings placed in front of the walls, which themselves are also provided with openings. In the latter case the plates with openings preferably constitute the legs of a U-shaped structure comprising two legs and a connecting limb. It is advantageous in that case if the legs and the connecting limb are one integral whole and the legs are bent from the plane of the connecting limb. This renders it easier to align the openings accurately relative to one another.

In an embodiment, the light-transmitting openings have a rectangular shape with one side parallel to the direction of movement of the tube. In this case the width of the opening or openings is constant. The tube may have, for example, a square, rectangular, oval, or circular cross-section. It is practical if the height of the openings is smaller than the diameter of the tube. The tube, or a projection fastened thereto, should then be partly in the light beam at one side.

In an embodiment of the Coriolis flowmeter according to the invention, the at least one tube position sensor is provided with means for monotonically varying the light incident on the detector surface in consecutive partial regions of the detector surface as seen in the direction of movement of the tube. This may be realized by various methods.

A first method is to vary the sizes of the partial regions.

A second method is to vary the intensity of the light incident on the partial regions, which are of the same surface area.

In an embodiment in which the sizes of the partial regions are made to vary, the dimension of the light-transmitting openings transverse to the direction of movement of the tube decreases monotonically (for example from wide to narrow), seen in the direction of movement of the tube. This ensures that a signal is obtained that increases or decreases monotonically with the movement of the tube, which is not possible, for example, when rectangular openings are used. A simple shape for this purpose is a triangle whose height is parallel to the direction of movement of the tube. If such tapering windows are used, the height of the window must be greater than the diameter of the tube, and the tube must lie entirely within the height of the light beam. The same holds mutatis mutandis for a projection fastened to the tube.

A similar effect can be obtained with a tapering opening provided in the vane, which opening is higher than the height of the rectangular light beam and is placed such that the entire height of the beam falls within the tapering window.

In an embodiment designed for varying the intensity of the light incident on the partial regions, the latter being of the same surface area, a filter with a transparency gradient that is monotonic in the direction of movement of the tube is placed in the light path between the light source and the light detector. Such a filter may be constructed in various manners which will be discussed in more detail further below in the description.

The tube may cooperate with one position sensor of the type described above. If the position sensor is placed on the axis of rotation of the actuating movement, it will not measure the actuating movement. Since the axis of rotation of the Coriolis movement is per definition perpendicular to that of the excitation, the sensor will measure (exclusively) the Coriolis movement. An exception to this would be formed by a placement of the position sensor in the point of intersection of the two axes of rotation. The most favorable position for the sensor is that point of the tube on the axis of rotation of the excitation that is as far removed as possible from the axis of rotation of the Coriolis movement.

Preferably, the tube cooperates with at least two such position sensors which are arranged at a small mutual distance on either side of the axis of rotation about which the tube is moved (and preferably symmetrically with respect thereto).

A third position sensor may be arranged next to one of the first and second position sensors and in line therewith. There are various methods of measuring positions by means of three sensors in line, two on either side of the axis of rotation and the third one next to one of the other two.

If two or three position sensors in line are used, it is advantageous to use a U-shaped structure in whose legs the light-transmitting openings are provided and which is integral for all (two or three) position sensors.

A further embodiment is characterized in that the excitation of the tube is effected by a contactless Lorentz force or torque excitation. The tube may be a straight tube or a curved tube. In the latter case a tube in a U-shape (open loop) is very suitable. An alternative is a tube in the form of a mechanically closed loop lying in one plane, whose two ends are bent back through the center of the loop and are mechanically interconnected such that the loop is resiliently suspended.

The invention also relates to a Coriolis flowmeter wherein a projection (in the form of a dummy tube or a vane) is provided on the wall of the tube, which projection moves in the light path upon a movement of the tube outside the light path. This projection may be integral for two or three position sensors. A preferred embodiment is characterized in that the projection is a vane that is tangentially provided on the tube.

The invention will now be explained in more detail by way of example with reference to the drawing, which shows a few embodiments.

FIG. 1 is a perspective view of a Coriolis flowmeter with a U-shaped tube;

FIG. 2 shows a looped tube of the so-termed mechanically closed type which is flexibly suspended by its inlet and outlet tube;

FIG. 3A is a perspective view and FIG. 3B a front elevation of a permanently magnetic magnet yoke with two gaps through which a tube portion extends, showing how a torque excitation of the tube portion is effected;

FIGS. 4A and 4B diagrammatically show an optical sensor operating in a transmission mode, as used in the flowmeter of FIG. 1;

FIG. 5 shows an arrangement of two optical sensors and a tube portion;

FIG. 6A shows a phase difference occurring between the signals of the sensors of FIG. 5 during a measurement without flow, and FIG. 6B shows the situation in which there is a mass flow through the sensing tube;

FIG. 7 is a cross-sectional view of an optical position sensor with a Coriolis tube;

FIG. 8 is a plan view of the Coriolis tube of FIG. 7 with the light beam generated by the position sensor;

FIG. 9 plots the voltage against the excursion of an optical position sensor;

FIG. 10 plots the voltage of the output signal against the excursion for the case in which the height of the light beam is greater than the diameter of the tube;

FIG. 11 is a plan view of a Coriolis tube with a light beam having a tapering (triangular) cross-section;

FIG. 12 plots the voltage of the output signal against the excursion of an optical position sensor when a light beam with a tapering (triangular) cross-section is used;

FIG. 13 shows the definition for a tapering shape;

FIG. 14 shows different tapering shapes;

FIG. 15 is a perspective view of a set of optical position sensors which produce a light beam with a tapering shape;

FIG. 16 is a cross-sectional view of one of the position sensors of FIG. 15;

FIG. 17 shows a planar plate, in which openings have been provided for shaping the light beams, designed for constructing three optical position sensors;

FIG. 18 shows the plate of FIG. 17 after two lateral portions thereof have been folded upward;

FIG. 19 shows an optical sensor in which a filter with an increasing or decreasing transmission gradient is placed in the light beam;

FIG. 20 shows the transmittance of the filter of FIG. 19 as a function of the height;

FIGS. 21A-C show various embodiments in which a wedge-shaped block is placed in the light beam of an optical sensor;

FIG. 22 shows an optical sensor whose detector is arranged at an angle to the light source;

FIG. 23 shows a wedge-shaped block with a concave side that is to be placed in the light beam of an optical sensor;

FIG. 24 is a front elevation of the combination of an optical sensor with a flow tube having a symmetrically provided tangential vane;

FIG. 25 shows a flow tube with an asymmetrically provided tangential vane;

FIG. 26 is a perspective view of a flow tube with a tangential vane that is integral for three optical sensors;

FIGS. 27A and B are elevations of two embodiments of a flow tube with a radial vane;

FIG. 28 is an elevation of a flow tube with a vane provided in a position between radial and tangential;

FIG. 29 is an elevation of a flow tube with a transverse vane;

FIG. 30 is a perspective view of a flow tube with a transverse vane in a position rotated through 90° with respect to FIG. 29 and an optical sensor in which the transverse vane can move;

FIG. 31 is a side elevation of a flow tube with a tangential vane provided with three openings for three sensors;

FIG. 32 is a side elevation of a flow tube with a tangential vane with three openings extending right up to the edge for three sensors; and FIG. 33 shows a flow tube with a radial vane having three openings, as in the type shown in FIG. 31, and one of three optical sensors in which the radial vane can move in perspective view.

Figure 1:
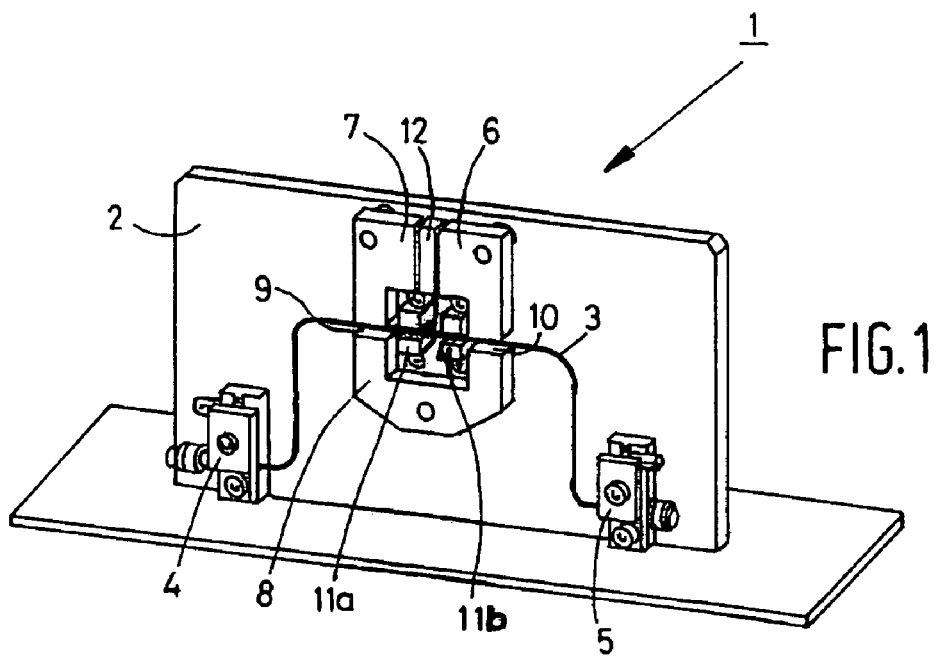
FIG. 1 shows an embodiment of a Coriolis flowmeter 1. This is provided with a frame having a base plate 2 which supports a tube 3 through which a medium flows during operation. The tube 3 in this case is a looped tube comprising half a turn (U-shaped tube), but it may alternatively be a straight tube or a looped tube comprising a full turn (closed loop). Looped tubes are preferred because they are more flexible than a straight tube. The tube 3 is fastened to the base plate 2 by fastening means 4, 5. Said means 4, 5 form clamping locations relative to which the tube can move. In the context of the invention, the tube, e.g. made of stainless steel and having a wall thickness of approximately 0.1 mm and a diameter of approximately 0.75 mm, is of a very light construction that can be brought into resonance with very little energy. Depending on the external dimensions of the loop 2 and the pressure the tube should be able to withstand (e.g. 100 bar), the outer diameter of the tube will generally be less than 2 mm and its wall thickness 0.2 mm or less.

In order to realize a very lightweight construction, no components that add mass to the tube 3 have been applied to the tube 3 for the purpose of its excitation. This is made possible by the fact that the construction for the actuation or excitation (i.e. causing to vibrate) of the tube utilizes so-termed Lorentz forces. (Lorentz force: electrons moving in a magnetic field experience a force in a direction perpendicular to both the direction of the magnetic field and the direction of movement of the electrons). These forces are generated in the flowmeter 1 of FIG. 1 in that an electric current is passed through the wall of the (electrically conductive) tube 3, while at the same time a permanently magnetic magnet yoke 6, 7, 8, 12 provided with a central opening (reference numeral 12 indicating a permanent magnet with one pole facing the yoke part 6 and an opposite pole facing the yoke part 7) causes two oppositely directed magnetic fields to arise in the gaps 9 and 10 transverse to the current direction and in the plane of the tube 3. An electric current I may be directly injected into the (U-shaped) tube 3 of electrically conductive material in that a current source (for example an AC source) is connected to ends of the tube 3 via connection terminals.

It is preferred, however, to generate the electric current in the tube by means of induction. A tube portion of the U-shaped tube 3 in such a case extends through the core of a transformer. A primary coil is wound on this core and can be energized by a current source. The relevant tube portion then acts as a secondary coil in which a current I is induced when a current flows through the primary coil. Instead of one, comparatively large transformer core with a primary coil, two smaller transformer cores each with a primary coil may be used, if so desired, for example each coil surrounding a respective leg of the U-shaped tube.

The movement of the tube under the influence of Coriolis forces is detected in this case by means of two contactless tube position sensors 11$a$ and 11$b$ of the type according to the invention. These will be discussed further below.

Figure 2:
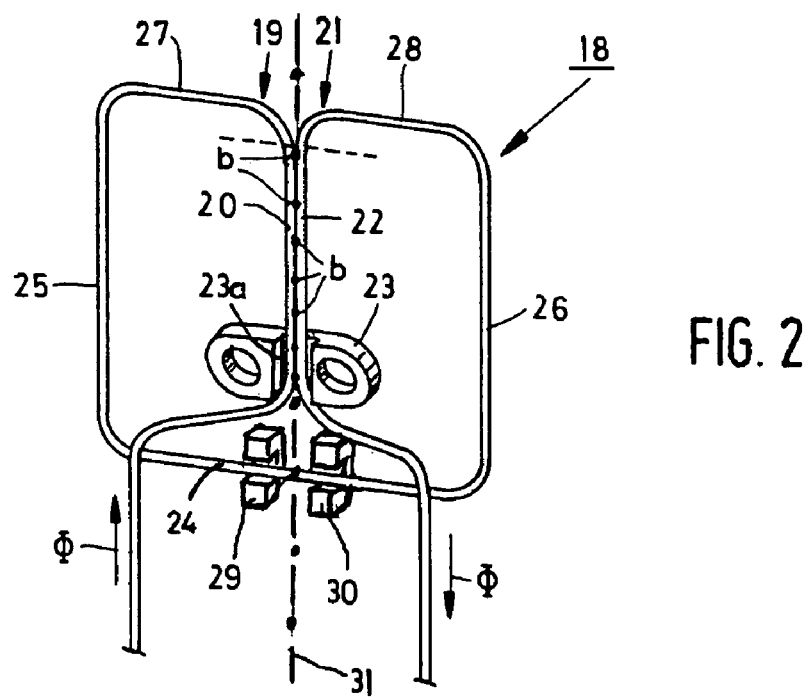

FIG. 2 is a perspective view of a mechanically closed loop-shaped (in this case a rectangle enclosing) tube 18, but in an alternative embodiment the closed loop-shaped tube may have, for example, a delta shape. The expression "mechanically closed" as used herein denotes that the ends of the loop shape are mechanically interconnected. A first end 19 of the loop 18 is connected to a flexible inlet tube 20 that supplies a medium flow $\phi$, and a second end 21 of the loop 18 is connected to a flexible outlet tube 22 through which the medium flow $\phi$ is discharged. The looped tube 18 and the tubes 20, 22 are preferably bent from one piece of tubing. The loop 18 comprises a first transverse tube 24 which is connected to first ends of two lateral tubes 25, 26. The latter are connected by their second ends to two second transverse tubes 27, 28 which each have approximately half the length of the first transverse tube 24. The inlet and outlet tubes 20, 22 in this construction extend symmetrically through the center of the loop 18, lie against or close to one another, and are mechanically interconnected in locations referenced b, for example by means of soldering or welding. They are fastened, while lying next to or against one another, to a fastening means 23 which in its turn is connected to a frame (not shown). The loop 18 is resiliently suspended from the frame of the flowmeter (not shown) by means of the inlet and outlet tubes 20, 22 (and the fastening means 23). The looped tube 18 is capable of cooperating with a permanently magnetic yoke for the purpose of its excitation, such as the magnet yoke described with reference to FIG. 1 and comprising yoke parts 6 and 7 located opposite a lower yoke part 8 so as to enclose two air gaps 9 and 10 and a magnet 12 placed in the path of the magnet yoke. For example, the tube portions 27, 28 may extend through the air gaps of the magnet yoke (the magnet yoke surrounding the upper tube portions). When an alternating current is passed through the looped tube 18, the loop will perform an oscillatory movement about an axis 31 (the excitation axis) extending in the plane of the loop under the influence of the Lorentz forces generated by the current and the oppositely directed magnetic fields (so-termed torque excitation). If a medium flows through the tube 18, Coriolis forces are generated which cause a Coriolis effect. The Coriolis forces cause the tube 18 to perform a vibratory movement about a so-termed Coriolis response axis which is perpendicular to the excitation axis 31 in the plane of the loop (indicated by a broken line in FIG. 2). Sensors for detecting Coriolis forces may be arranged in the central opening of the magnet yoke (thus cooperating with the upper transverse tubes in operation).

A favorable alternative is to arrange the sensors adjacent the lower transverse tube 24, so that they can cooperate with the lower transverse tube in operation. By way of example, FIG. 2 shows (optical) sensors 29 and 30, of a type yet to be described below, arranged on either side of and symmetrically with respect to the axis 31. Depending on the location of the torque excitation yoke relative to the rectangular looped tube of FIG. 2, the tube may be brought into a swing excitation mode or a rotation (or twist) excitation mode. This is to say: either twisting about the central axis of symmetry between the inlet and outlet tubes, or swinging about an asymmetrical excitation axis that is transverse to the central axis of symmetry, in which case the torque excitation yoke cooperates with a lateral tube portion.

Figure 3A:
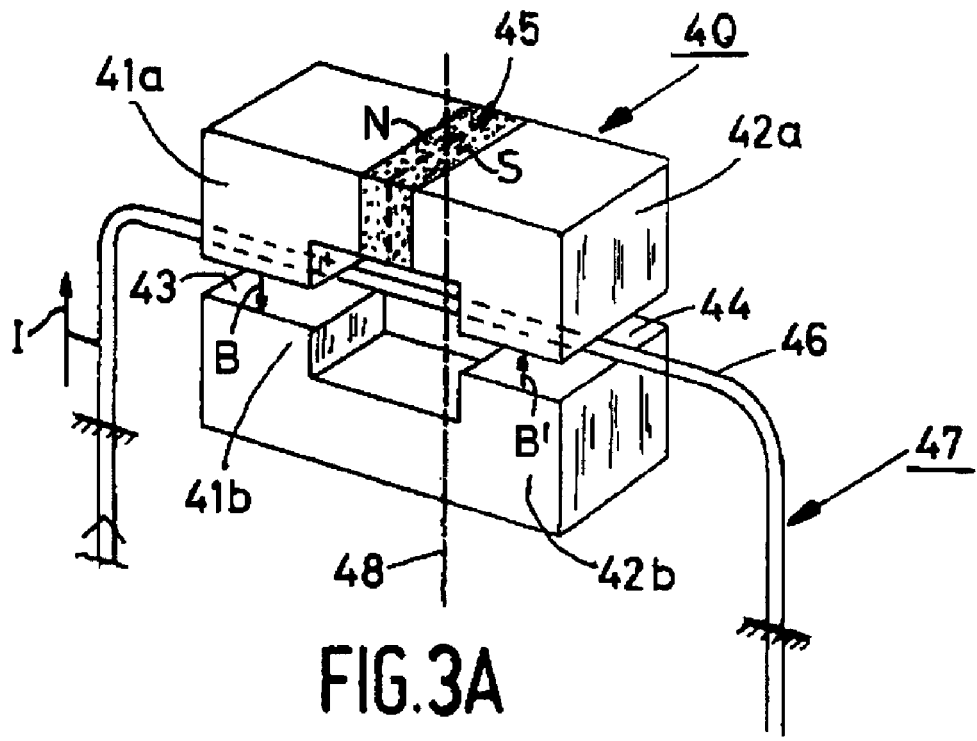
Figure 3B:
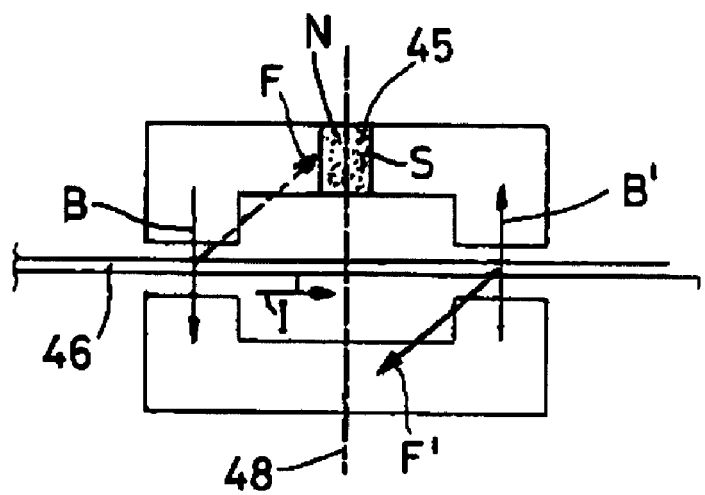

FIG. 3A is an elevation of an integrated permanent magnet yoke 40 with a first pair comprising two mutually opposed magnet poles 41$a$, 41$b$ and a second pair comprising two mutually opposed magnet poles 42$a$, 42$b$. An air gap 43, 44 is formed between the poles of the each pair. The tube portion 46 of the U-shaped tube 47 extends through these gaps. A permanent magnet 45 is arranged in the path of the surrounding yoke 40 with its north and south poles oriented such that a surrounding magnetic field is created wherein mutually opposed magnetic fields B and B' of per definition equal strength arise in the air gaps 43, 44. Given a direction of the current I as schematically indicated in FIG. 3B, which is a front elevation of the assembly of FIG. 3A, Lorentz forces of equal strength F (directed towards the rear) and F' (directed towards the front) will thus act on the tube portion 46, reversing their directions upon a reversal of the current in the tube wall. This torque excitation causes the tube 47 to perform a reciprocating rotation (vibration) about the axis 48, which coincides with the main axis of symmetry of the U-shaped sensing tube 47. The construction of the permanent magnetic yoke 40 with two air gaps for torque excitation is such that the values of the forces F and F' are the same in principle but oppositely directed. Were the forces unequal in value, a non-ideal torque excitation would be the result. In the ideal case in which they are exactly identical there will be a pure moment of force equal to the product of the force F and the distance between F and F'. The direction of the torque vector (usually denoted T) then lies along the centerline 48 of the yoke 40 in FIG. 3B.

One or several optical sensors are preferably used for the invention, referenced 11$a$ and 11$b$ in FIG. 1. The optical sensors are placed in the central opening of the magnet yoke 6, 7, 8, 12 in the construction of FIG. 1 such that they can cooperate with the tube in a contactless manner.

Figure 21:
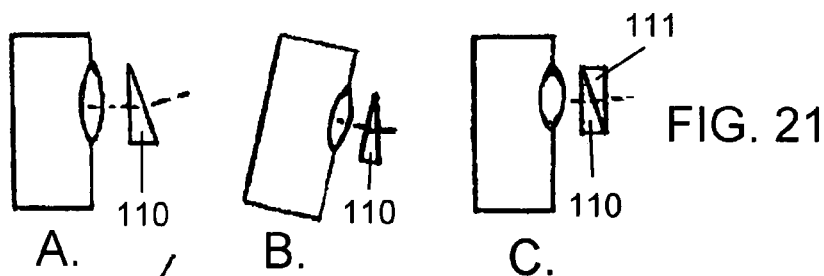

FIG. 4 diagrammatically shows one of the optical sensors used, in this case the optoelectronic sensor 11$a$, in more detail. this sensor comprises a U-shaped housing 51 with a light source 49 (e.g. an LED) on the inside of one leg of the U and a light-measuring cell 50 (e.g. a phototransistor) on the inside of the other leg of the U. The optoelectronic sensor 11a is located such that a tube portion 52 can move between the legs of the U-shaped housing. During operation the tube 52 will block the light path between the light source 49 and the light-measuring cell 50 to a greater or lesser degree. In an embodiment in which the tube is provided with a projection (cf. e.g. FIG. 21), the tube can be farther removed from the housing while the projection can move between the legs.

FIG. 4B shows in more detail how the tube portion cuts off a greater (position 52) or smaller (position 52') portion of the light beam 53 transmitted by the light source 49 to the light-measuring cell 50. The light-measuring cell 50 produces a signal u(V) that can be measured by a meter.

FIG. 5 diagrammatically shows the detection process by means of two optoelectronic sensors 11a, 11b. According to an aspect of the invention, these sensors are present on either side of, and preferably symmetrically arranged relative to the location where the axis of rotation about which the excitation means cause the tube to rotate intersects the tube portion 52 (3). This point of intersection is called the (rotation) pole P. The sensors 11a, 11b are preferably at a small distance from this pole. This distance should be sufficiently small so as to ensure that the measured contribution of the excitation is of the same order of magnitude as the measured contribution of the Coriolis forces. The sensors measure the (sinusoidal) displacements (in mm) of points of the tube as a function of time (in s) by means of a voltage.

FIG. 6A shows the output signals of the sensors 11a, 11b for the case in which no medium is flowing through the tube (zero flow), the curve indicated by arrow a representing the measuring signal of sensor 11a and the curve indicated by arrow b representing the measuring signal of sensor 11b. The phase difference is 180°.

FIG. 6B shows the situation where a medium is flowing through the tube. The phase difference is smaller than 180°. The result of the measurement is not accurate, however, if the rotation pole is not located exactly between the first and the second sensor. A more accurate measurement is possible when a third sensor is placed adjacent one of the sensors of FIG. 5, and in line with these sensors. The phase difference between the sensors 11a and 11b can be corrected for any shift of the rotation pole by means of the signal of this third sensor. This difference is 180° for a symmetrical sensor position without flow, but in the extreme case in which a sensor coincides with the pole it is no more than 90°. The three sensors supply three measuring values while there are also three unknowns: the two—different—phase angles of the first and the second sensor and the position of the rotation pole between the first and the second sensor. The value measured by the third sensor can be used in a processing device for determining the location of the rotation pole, whereupon the—identical—phase angles of the first and the second sensor can be determined for a fictitious pole position that does lie centrally between the first and the second sensor.

The measuring and detection system described here, for which no amplifier is required, so that no undesirable phase shifts are caused, is suitable for use with all types of Coriolis flowmeters.

Figure 7:
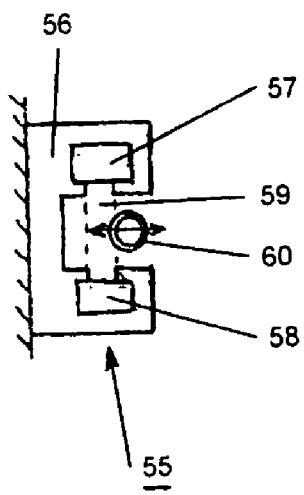

FIG. 7 diagrammatically shows an optical movement sensor (optosensor) plus a Coriolis tube, clarifying how the measurement of the displacement of the Coriolis tube is carried out. The optical movement sensor comprises a light source (often an LED in practice with a lens in front) and a light detector (often a photodiode or a phototransistor in practice).

The light source emits a light beam. As large as possible a portion thereof should be directed at the light sensor. The tube (or other object, such as a vane fastened to the tube) positioned between the light source and the light detector cuts off part of the light beam. When the tube is moving to and fro, the cut-off portion of the light beam will vary in size. The light detector translates the quantity of incident light into an electrical signal, as will be clarified further below.

Light radiating from the light source in a different direction does not interfere with the measurement of the light detector, unless it reaches the detector after all owing to reflection. Reflections which change with the position of the tube are especially disturbing. To prevent this, the surroundings of the light beam may be made non-reflecting.

Figure 8:
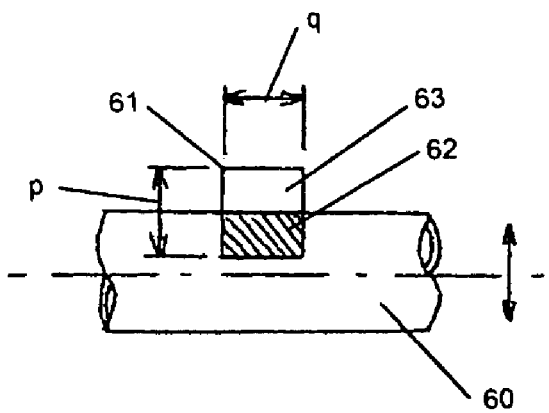

FIG. 8 is an elevation of the tube 60 of FIG. 7 in combination with the light beam 61, showing in addition to the tube 60 only the height p and width q of the light beam 61, which is shown to be rectangular here. The hatched portion 62 of the light beam 61 is cut off (blocked) by the tube. A rectangular light beam can be realized in that a rectangular window is placed in front of the light source. In order to obtain an optimum performance, it is desirable to provide identical windows at the emission and the reception side, so that a prismatic partial light beam is incident on the detector. It is achieved thereby that a displacement of the tube parallel to the beam does not influence the quantity of light incident on the sensor, only a displacement perpendicular thereto does. A specific rectangular window has the added advantage that the quantity of transmitted light is linearly proportional to the position of the tube. This does presuppose that the width sides of the rectangle are parallel to the longitudinal axis of the tube. It is preferred in an embodiment with rectangular windows that the dimension of the windows in the direction of movement is smaller than the diameter of the tube (or of a projection fastened to the tube). The tube (or the projection fastened to the tube) should then be partly in the light beam at one side in the manner as shown in FIG. 8.

A movement sensor with a window at the emission side or the reception side only will also show a variation in the quantity of light as a function of the displacement of the tube. In this case, however, there is no accurate measurement possible of only the perpendicular displacement.

The translation of the quantity of light incident on the light detector into an electrical signal takes place as follows. A light detector constructed as a phototransistor behaves as a light-dependent current source. The photons in the incident light beam release electrons in the phototransistor, which electrons cause a current. The quantity of generated current I can be used as the output quantity for the optical movement sensor. It is alternatively possible, however, to connect a resistor R in series with the phototransistor such that the voltage V across the resistor changes in accordance with Ohm's law: V=I.R.

Figure 9:
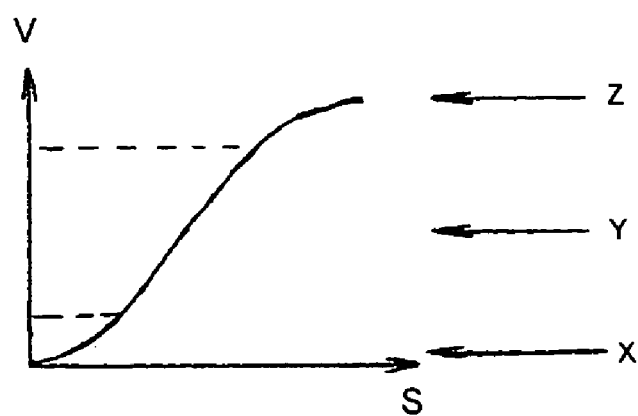

FIG. 9 shows a characteristic curve of the relation between the quantity of light incident on the light detector and the voltage V generated by this detector.

In practice, the photosensor has a non-linear characteristic as shown in FIG. 9. A purely sinusoidal movement of the tube will lead to a generated voltage that is not purely sinusoidal. This may also be regarded as a higher harmonic of this voltage. Whether this is a problem depends on the manner of signal processing; higher harmonics can be filtered out in principle.

Figure 10:
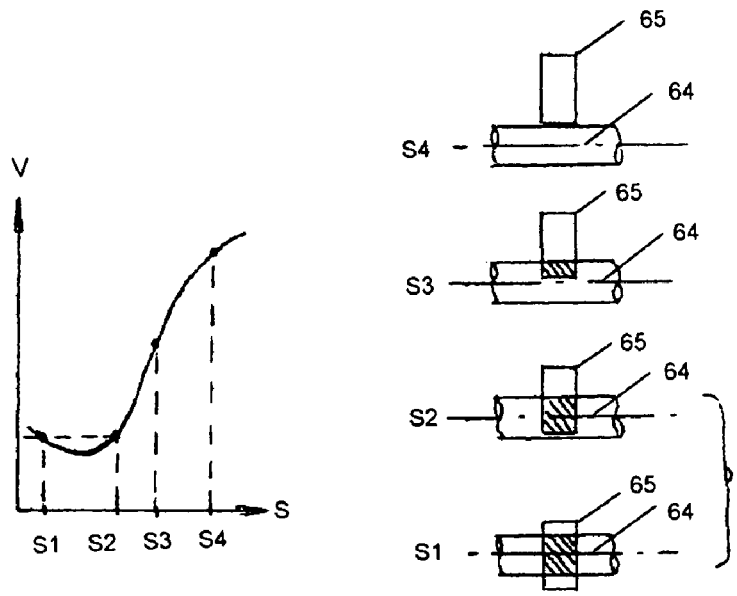

A property that is to be regarded as essential is that the characteristic should be monotonically rising, otherwise there will be two positions in which the light sensor generates the same voltage. This is the case if the height of the window is chosen to be greater than the diameter of the tube. This leads to an output signal V as shown in FIG. 10. S1, S2, S3, and S4 here indicate the different positions of a moving tube relative to a vertical (upright) rectangular window 65. The gradient of the curve between S1 and S2 need not necessarily be a dip as in FIG. 10. Depending on the detector characteristic, it may be e.g. a line parallel to the X-axis.

In certain applications it may be a problem that the height of the windows should be smaller than the diameter of the moving object.

For example:
  if the tube is very thin, which necessitates an accurate adjustment of the height;
  if the zero point may shift, e.g. owing to the force of gravity;
  if several tube position sensors placed on a common carrier (PCB) are to be vertically adjusted simultaneously.

Figure 11:
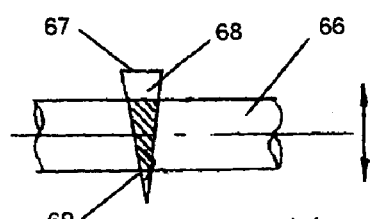

There is a possible alternative embodiment in which the window height is indeed allowed to be greater than the diameter of the tube. An essential characteristic thereof is that the window should be tapering in shape. FIG. 11 shows the simplest embodiment thereof: a triangular window 67.

Figure 12:
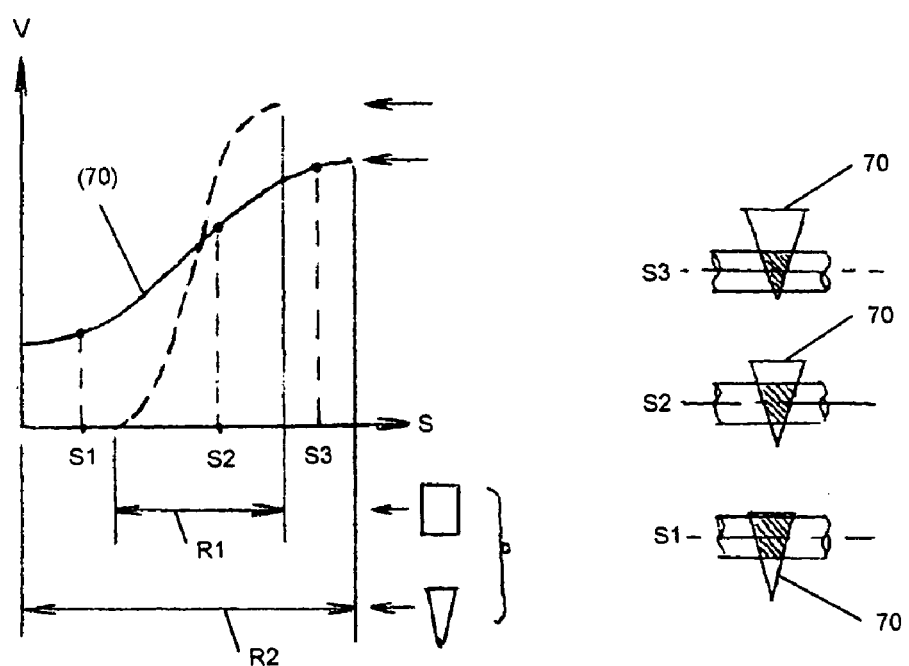

In proportion as the tube (or, if the tube is provided with a projection, the projection) moves upwards relative to the beam 70, a monotonically increasing portion thereof will be cut off. It is noted that the tube (or the projection) in its operative range must remain within the height of the light beam. The resulting monotonically rising characteristic of the use of triangular windows 70 is depicted in the left-hand half of FIG. 12, wherein the characteristic of the use of rectangular windows is also indicated by a broken line. The stroke coverage range R2 with the use of triangular windows is clearly greater than the stroke coverage range R1 with the use of rectangular windows.

Advantages of the greater stroke coverage range:
  less accurate height adjustment necessary;
  less interference caused by zero point shift.

Disadvantage:
  lesser resolution (voltage range) because the light beam is never fully covered.

It is possible to reduce this disadvantage through additional measures in the (analog) electronics:
  electronic elimination of the zero point offset;
  scaling up the maximum.

Figure 13:
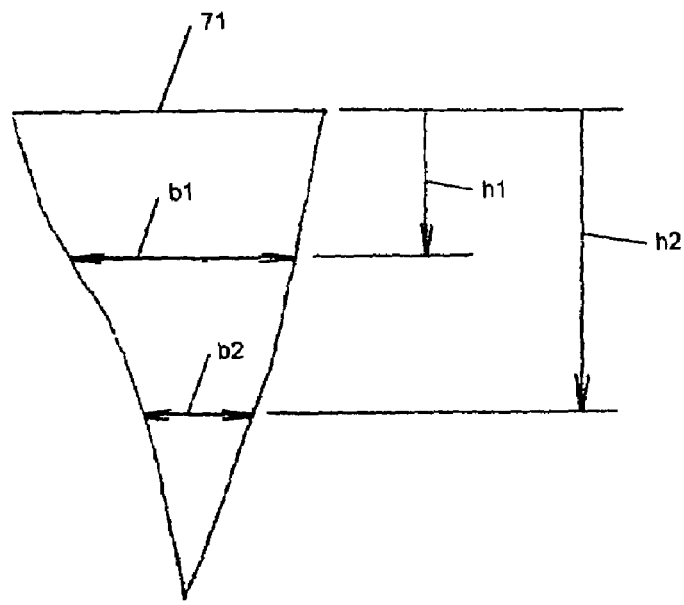

An essential shape characteristic of the window is, as was stated above, that its width should taper. This may be defined as shown in FIG. 13: it should hold for every h2>h1 that b2>b1. The sides of the triangle accordingly need not be straight, neither need the triangle be isosceles. It is also allowable that there are more than three corners, as long as the shape remains tapering. An almost semicircular shape, so with only two corner points, is also feasible.

Figure 14:
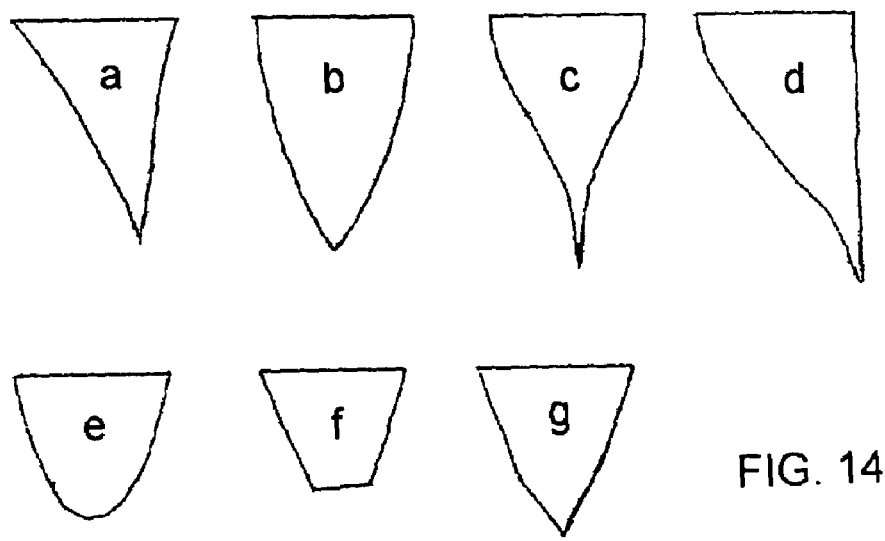

FIG. 14 shows possible window shapes a to g. The characteristic of the voltage versus stroke function can be influenced by means of such a shape. It is important that the shape of the window should be tapering at least in the operative range defined by the extreme positions of the tube movement, with the narrowest side at the bottom, as seen in the direction of movement of the tube, or with the narrowest side at the top.

Figure 15:
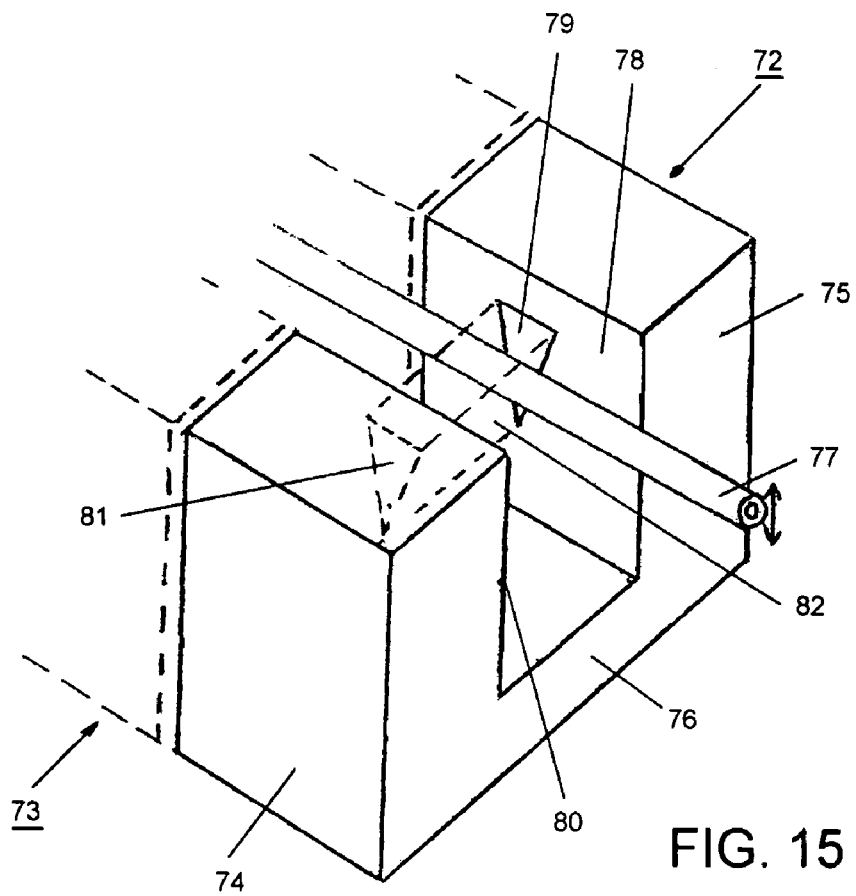

FIG. 15 is a perspective view of an optical position sensor 72 with a U-shaped housing comprising vertical legs 74 and 75 and a connecting limb 76. A Coriolis tube 77 is capable of moving with clearance in the space between the legs 75 and 76. In its movement it passes through a light beam 82 generated by a light source (not shown) in one of the legs. The light beam incident on the light sensor in the other leg is shaped in this case by an opening (window) 81 in the wall 80 of the leg 74 and an opening 79 in the wall 78 of the leg 75. The openings 79 and 81 are identical and oriented in the same manner relative to the (stationary) Coriolis tube 77. The openings 79 and 81 are tapering in shape (monotonically changing from wide to narrow).

The direction of movement of the tube is indicated by the double arrow. Next to and at a small distance from the position sensor 72 there is a position sensor 73 with a U-shaped housing constructed in the same manner as the housing of the sensor 72. The Coriolis tube 77 also extends through the legs of the housing of the sensor 73. The sensors 72 and 73 may be used, for example, to measure phase differences from which the instantaneous position of the tube 77 is derived.

Figure 16:
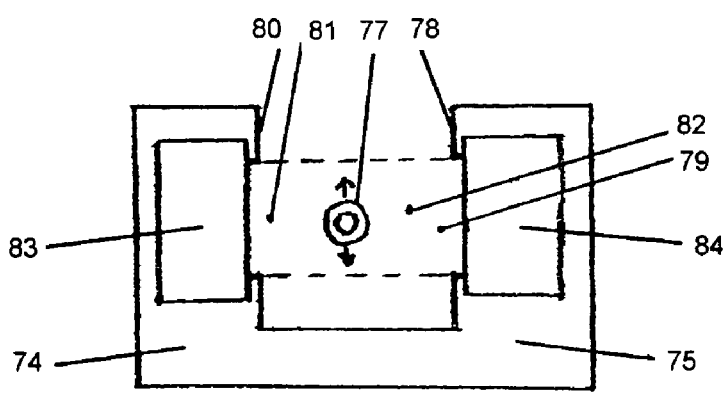

FIG. 16, which is a diagrammatic cross-sectional view of the sensor 72 of FIG. 15, shows the light source 83 (for example an LED) and the light detector 84. The light source 83 can send its beam directly to the window 81. The rays of light in the beam preferably run at least substantially parallel to one another. This can be achieved with a point-shaped light source which is arranged in the focus of an (ideal) lens. The usual LEDs, however, do not constitute point sources. Therefore, they often have an (integrated) lens which provides a more parallel course of the rays of light from the non-point-shaped light source. There may also be a lens at the side of the light detector for the case in which the detection surface area is smaller than the imaged surface area. A light sensor with a sufficiently large surface would obviously also be adequate.

Figure 17:
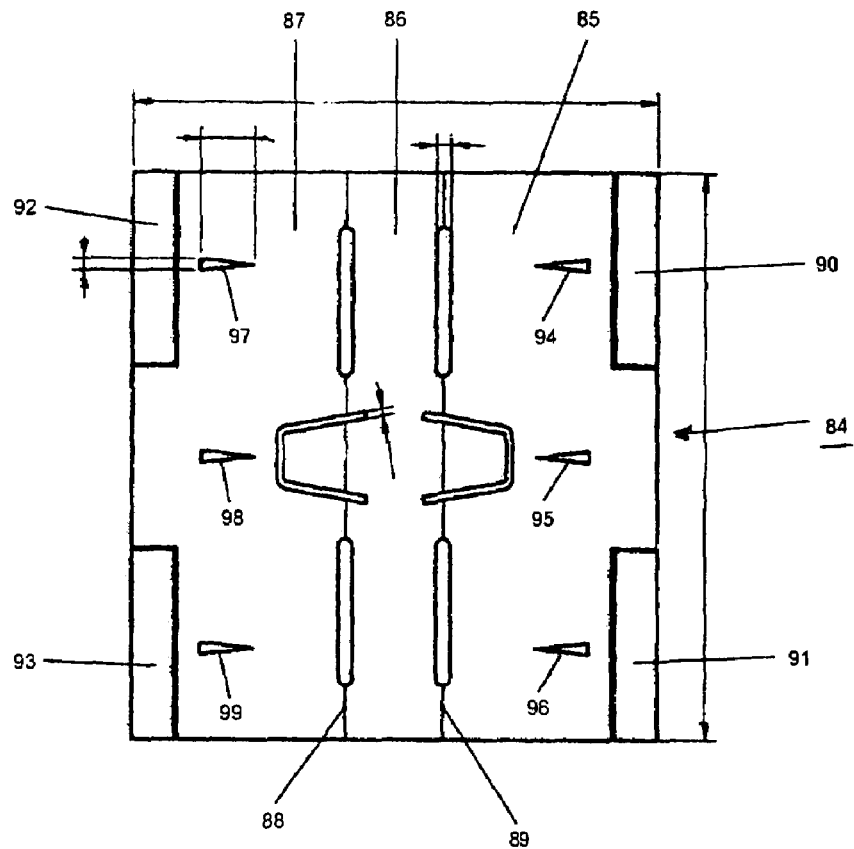
Figure 18:
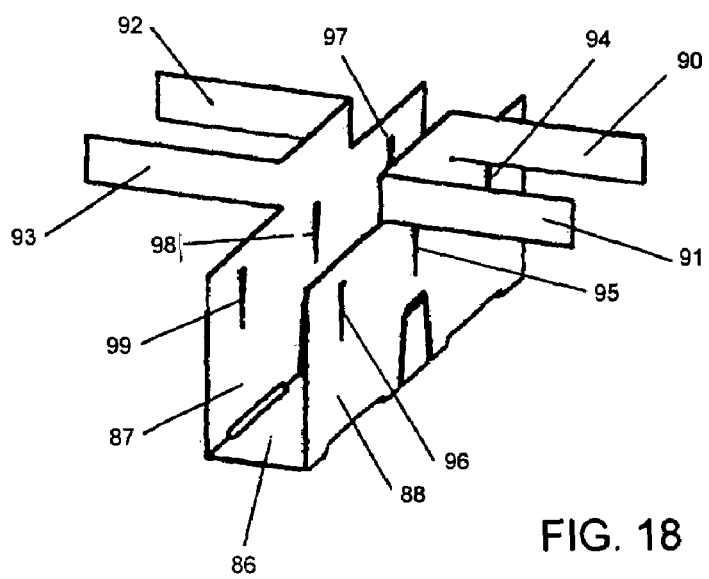

FIG. 17 shows a flat plate 84 with three regions 85, 86, 87, separated by folding lines 88 and 89. Regions 90, 91, 92, and 93 are partly incised. Triangular openings 94, 95, 96, and 97, 98, 99 are provided, for example by stamping, which lie two by two accurately in line at predetermined distances from one another. After folding along the lines 88 and 89, the construction of FIG. 18 is obtained. This is designed to be placed in the space between the legs of three U-shaped housings of position sensors that lie next to one another, such that the triangular openings in the plate 84 lie opposite the openings in the legs of the sensor housings. The triangular openings in FIG. 18 are to be regarded as vertically upright with their heights parallel to the direction of movement of the tube. The openings in the legs of the U-shaped sensor housings are generally rectangular and may have a horizontal or preferably vertical position with respect to the triangular openings. In an embodiment, the openings in the plate are smaller than the openings in the walls of the sensor housings. The folded regions 90, 91 and 92, 93 render it possible to obtain a secure fastening to the three sensors (not shown). The triangular openings 96, 99; 95, 98; and 94, 97 are in one line and at the same vertical level, so that an optimum alignment is obtained after placement in a sensor unit with three U-shaped sensor housings.

The above construction can be used to advantage not only in the case of three sensor housings, but also in the case of two sensor housings or even one sensor housing. The shape of the triangular openings can be adapted to the envisaged application. A triangular opening with a width greater than its height reduces the influence of noise. A triangular opening with a height greater than its width is found to give a more stable zero position.

An alternative embodiment is characterized in that plates with triangular openings are placed in front of or behind the openings in the sensor housings.

Figure 19:
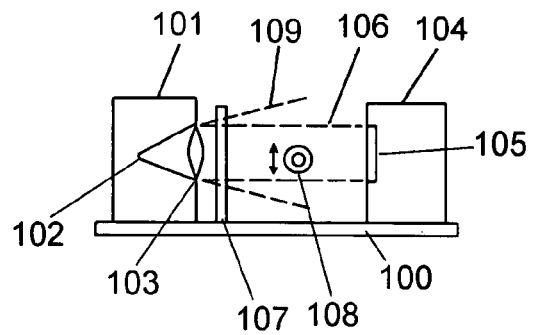

FIG. 19 shows an optical sensor with a sensor 100 having a housing part 101 that comprises a light source 102, in front of which a lens 103 is placed for forming a light beam 106 and having a housing part 104 with a light-sensitive detector 105. A light intensity that changes monotonically over the height of the beam is realized by a 'filter' 107 that is to be placed in the path of the beam and that has a transmittance that changes monotonically along its height. A Coriolis tube 108 is suspended such that it can vibrate in the light beam 106. In an embodiment, it is suspended such that it is at the edge of the light beam in the idle state. On other words: the filter forms a means for varying the light intensity monotonically in the direction of the height of the beam.

Figure 20:
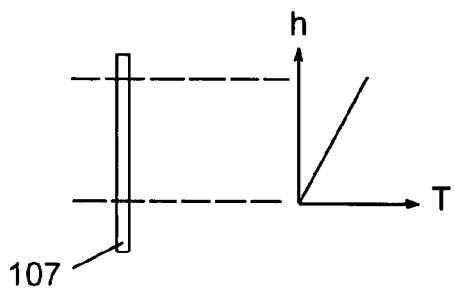

FIG. 20 shows a filter 107 by way of example with a transparency T that changes monotonically with the height h. Scattered light 109 (FIG. 19) arises owing to a non-point-shaped light source and lens defects, among other causes. This is not a major problem, except for possible reflections. The filter may be used without being combined with two (rectangular) windows. If the aim is to reduce the sensitivity to displacements of the tube in the direction of the beam to a minimum, however, it is advisable to cause the "used" light beam to consist of parallel beams as much as possible, for which purpose, for example, two (rectangular) identical aligned windows may be placed in the light path, as described above.

EMBODIMENTS

There are two basic embodiments for the 'filter' 107:

A flat plate with a transparency T that changes monotonically with the height h, for example through the application thereon of a layer of paint or ink with a coating gradient. A modification thereof that also gives a gradient in the light intensity is formed by two polarization filters placed against one another, one having a linear and the other a circular polarization.

A wedge-shaped block 110 having a thickness that decreases from bottom to top and made of a material of limited transmissivity, such as most synthetic resins. The light will be deflected in the wedge 110 (FIG. 21A). This may be compensated in that either the light source is placed at an angle (FIG. 21B), or a further wedge 111 of clear glass with the same refractive index is added (FIG. 21C).

A laser diode is a more satisfactory light source than an LED because it is a more point-shaped light source of higher energy density. In combination with a lens this can then be made into a more parallel beam. The longer the focal distance the better. The combination of laser diode+lens may be thought of as being similar to a laser pointer or a laser in a CD-player. It is the same size as an LED in principle.

For practical reasons the surface area of the detector should preferably be approximately the same size as that of the lens (=the main beam). This at the same time reduces the sensitivity to scattered light outside the beam.

Figure 22:
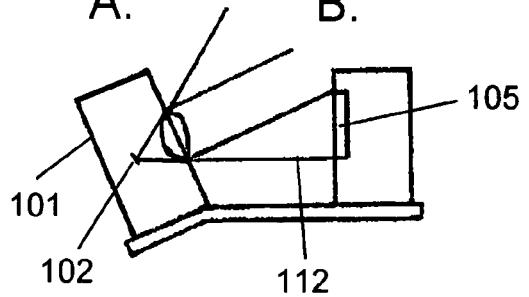

Modifications:

Various modifications are conceivable in the implementation of the principle set out above:

An alternative method of making a parallel beam is to use a plate with a large number of small holes instead of a lens, comparable to a catalyst in a car, though this does lead to a loss of light;

It is alternatively possible to provide a monotonically increasing light intensity not by placing a filter in front of an LED (or laser diode) but by arranging the housing part 101 with the light source 102 at an angle to the detector surface (FIG. 22). The lateral side 112 of the emitted light beam only is used for this, the light intensity radiated in the direction of the light detector 105 now depending on the viewing angle.

Figure 23:
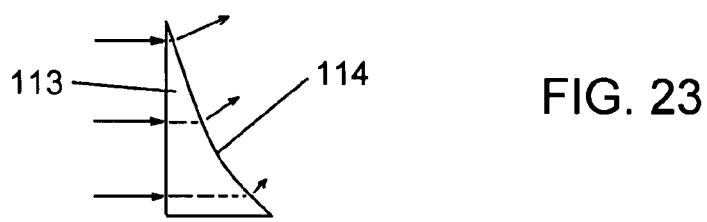

A wedge-shaped block 113 with a concave radiating side 114 provides at its bottom not only less transmission, but also more deflection, so a stronger light gradient (FIG. 23).

FIG. 24 is a front elevation of a U-shaped sensor housing 115 with a window 116 behind which a light source (not shown) is situated, which light source sends a beam of light to a window 117 behind which a light detector (not shown) is arranged. A tangential projection 120, a vane in this case, is fastened to a flow tube 119. In an alternative embodiment the projection is a hollow or solid tube through which no flow takes place. The vane 120 is fastened such that it moves up and down through at least part of the light beam 117 when the tube 119 moves. The projection (vane or otherwise) 120 may be directly fastened to the tube 119 by means of brazing, soldering, or gluing, or indirectly by means of one or more tags. The tangential vane 120 is provided symmetrically with respect to the center of the tube 119 in FIG. 24, at the side of the light source in this case. It may be advantageous in practical embodiments if the vane, or more generally the projection fastened to the tube, is fixed to the detector side of the tube.

An alternative is formed by the tube-vane construction of FIG. 25, where a tangential vane 123 is provided asymmetrically with respect to the center of the tube 122. The vane 123 may be so long that the light beam never 'sees' the tube 122. In the case of a shorter vane (favorable on account of its mass), a light beam 118 may possibly see the tube 119.

FIG. 26 is a perspective view of a sensor unit with three U-shaped sensor housings 115, 115', and 115", each constructed as the sensor housing 115 of FIG. 24, where the tangential vane 120 fastened to the flow tube 119 is integral for all three sensor housings. In an alternative application the tube has, for example, a (tangential) vane for cooperation with one or two sensor housings.

Figure 27:
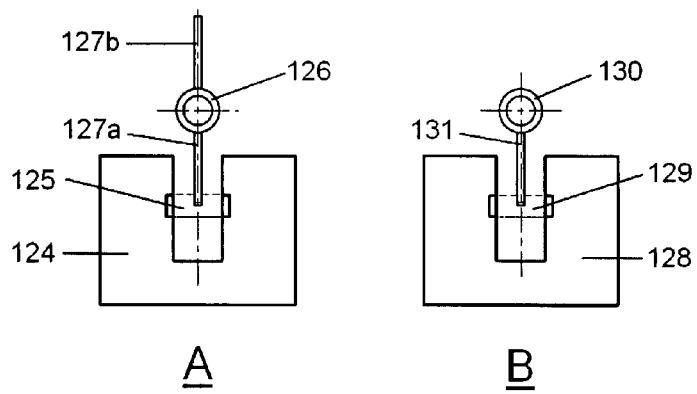
Figure 28:
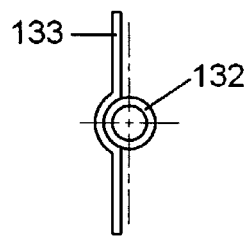

FIG. 27A shows a sensor housing 124 with a tube 126 and a double radial vane 127a, 127b that moves relative to a light beam 125, and FIG. 27B shows a sensor housing 128 with a tube 130 and a single radial vane 131 that moves relative to a light beam 129, while FIG. 28 shows a tube 132 with a vane that is fastened in a position midway between radial and tangential around the tube 132.

Figure 29:
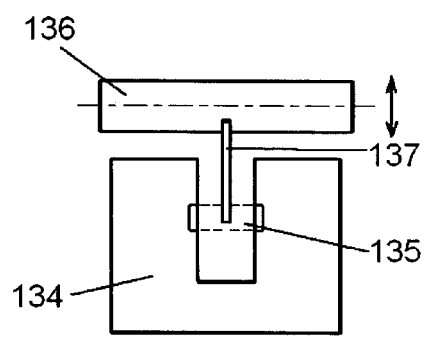

FIG. 29 shows a sensor housing 134 with a tube 136 having a transverse vane 137 that moves relative to a light beam 135. The tube 137 here moves up and down above the housing in the direction of the arrow.

Figure 30:
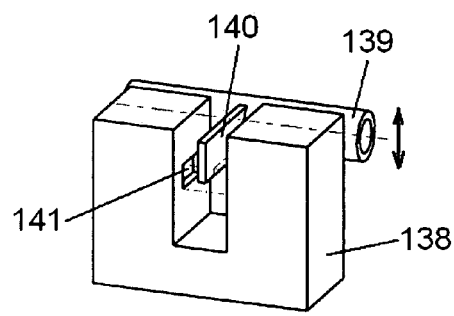

FIG. 30 shows a sensor housing 138 with a tube 139 having a transverse vane 140 that moves relative to a light beam 141. The tube 139 here moves up and down laterally of the housing 138 in the direction of the arrow.

Two fixed tapering windows (V-windows) of equal shape and higher than the diameter of the tube were discussed above. The tube in that case provided a shadow. An advantage of this was that the vertical position range was increased. The latter is most useful for a thin tube because of a static sagging that may possibly take place therein. A solution that forms an alternative to the tapering windows is that the tube is made seemingly thicker locally through the fastening thereto of a projection (vane or dummy tube, possibly with legs). In that case a normal rectangular window that is sufficiently high for vibration amplitude+sagging will provide the best signal: linearly proportional to position, highest light output. This is true, however, when the light beam is at the edge of the vane.

A modification is the use of a vane fastened to the tube and having a tapering opening that is higher than the height of the light beam obtained by means of two rectangular light-transmitting openings and that is positioned such that the entire height of the beam falls within the tapering opening.

Figure 31:
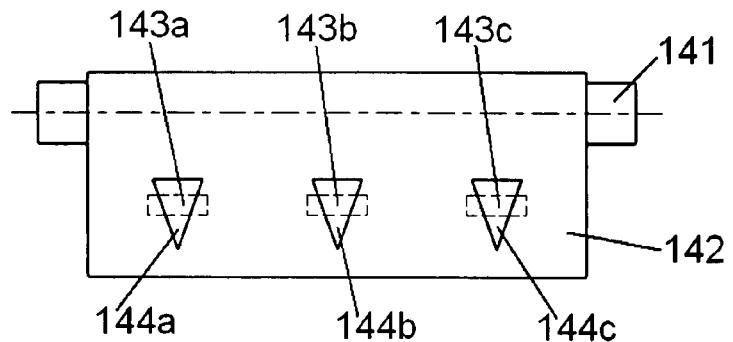

An example of an embodiment is presented in FIG. 31, which shows a tube 141 provided with a tangential vane 142, in this case for cooperation with three sensors. The vane 142 has a triangular opening 144a, 144b, 144c for each sensor in combination with a comparatively narrow light beam 143a, 143b, 143c (shown in broken lines).

Figure 32:
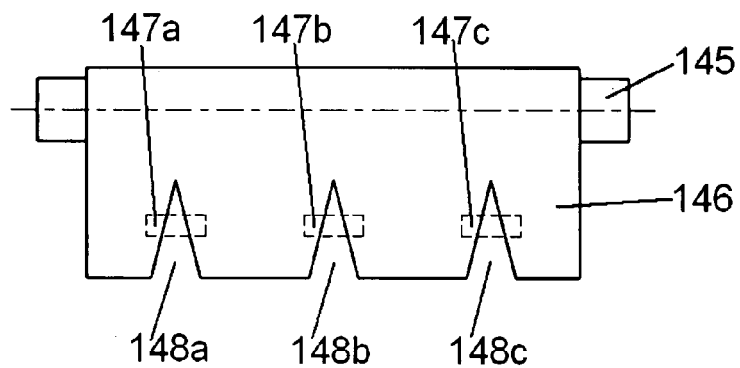

FIG. 32 shows an embodiment in which the triangular openings 148a, 148b, 148c extend right through to the lower edge of the tangential vane 146 fastened to the tube 145. The light beams of the sensors are referenced 147a, 147b, 147c here. The combination of triangular openings in the vane with comparatively flat light beams can increase the vertical position range of the tube. A narrow area of the detector is illuminated at any one time here, whereas in the case previously discussed of a narrow tube without vane and triangular windows connected to the fixed world there was a narrow shadow incident on the detector.

Figure 33:
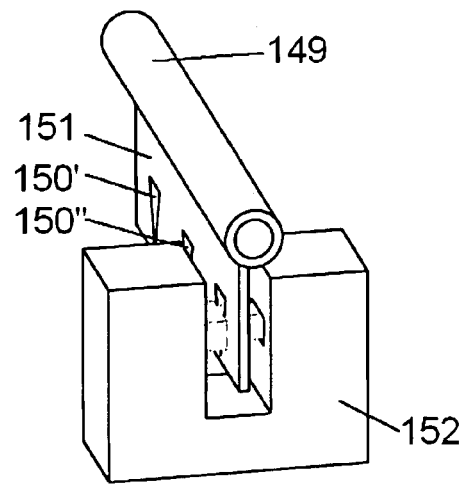

FIG. 33 is a perspective view of a tube 149 to which a radial vane 151 with triangular openings 150a, 150b, 150c arranged in front of three sensors is fastened. Only one U-shaped sensor 152 is shown. The beams issuing from the triangular openings are narrower than those incident on the vane 151. The triangular (tapering) openings may be provided not only in a tangential vane (FIGS. 31, 32) or in a radial vane (FIG. 33), but also in one of the other types of vanes mentioned above: transverse vane, axial vane, vane in a position between radial and tangential. A vane may have one opening for one sensor, two openings for two sensors or, as in FIGS. 31 to 33, three openings for three sensors.

Summarizing, the invention relates to a Coriolis mass flowmeter comprising a flow tube, at least one tube position sensor provided with a light source and with a light detector for receiving light from the light source, and drive means for causing the tube to move about an axis, the above being arranged such that the light detector provides a signal in response to a displacement of the tube relative to a light path between the light source and the light detector, wherein the light source and the light detector are positioned right opposite one another at a predetermined distance from one another and are separated by an intervening space in which the tube or a projection fastened to the tube can move with clearance in the light path, wherein a first screen with a first light-transmitting opening is placed at the side of the light source and a second screen with a second light-transmitting opening is placed at the side of the light detector, wherein the first and the second opening are identical and are correspondingly oriented, and wherein the openings are mutually parallel and aligned.

The invention claimed is:

1. A Coriolis mass flowmeter comprising a flow tube, at least one tube position sensor provided with a light source and with a light detector for receiving light from the light source, and drive means for causing the tube to move about an axis, the above being arranged such that the light detector provides a signal in response to a displacement of the tube relative to a light path between the light source and the light detector,
wherein the light source and the light detector are positioned right opposite one another at a predetermined distance from one another and are separated by an intervening space in which the tube or a projection fastened to the tube can move with clearance in the light path, wherein a first screen with a first light-transmitting opening is placed at the side of the light source and a second screen with a second light-transmitting opening is placed at the side of the light detector, wherein the first and the second openings are identical and are correspondingly oriented, and wherein the openings are mutually parallel and aligned to shape the light beam incident on the light detector.

2. A Coriolis flowmeter as claimed in claim 1, characterized in that the at least one tube position sensor comprises a U-shaped housing with two mutually facing legs, in one of which the light source and in the other one of which the light detector is present.

3. A Coriolis flowmeter as claimed in claim 2, characterized in that the first and the second screen are formed by the mutually facing walls of the legs of the U-shaped housing.

4. A Coriolis flowmeter as claimed in claim 2, characterized in that the mutually facing walls of the legs are provided with openings, and in that the first screen is arranged with its light-transmitting opening opposite the opening in the wall of the one leg and the second screen is arranged with its opening opposite the opening in the wall of the other leg.

5. A Coriolis flowmeter as claimed in claim 4, characterized in that the dimension of the first and second light-transmitting openings in the first and the second screen transverse to the direction of movement of the tube decreases monotonically from wide to narrow, as viewed in the direction of movement of the tube.

6. A Coriolis flowmeter as claimed in claim 1, characterized in that the first and the second screen constitute the legs of a U-shaped structure comprising two legs and a connecting limb.

7. A Coriolis flowmeter as claimed in claim 1, characterized in that the first and the second light-transmitting opening have a rectangular shape with one side of the rectangle parallel to the direction of movement of the tube.

8. A Coriolis flowmeter as claimed in claim 1, characterized in that the at least one tube position sensor is provided with means for monotonically varying the light incident on the detector surface.

9. A Coriolis flowmeter as claimed in claim 8, characterized in that said means for monotonically varying the light incident on the detector surface in consecutive partial regions of the detector surface comprise an optical wedge placed in the light path between the light source and the light detector.

10. A Coriolis flowmeter as claimed in claim 1, characterized in that the dimension of the first and second light-transmitting openings transverse to the direction of movement of the tube decreases monotonically from wide to narrow, viewed in the direction of movement of the tube.

11. A Coriolis flowmeter as claimed in claim 1, characterized in that a filter with a transparency gradient that is monotonic in the direction of movement of the tube is placed in the light path between the light source and the light detector.

12. A Coriolis flowmeter as claimed in claim 1, characterized in that the flowmeter comprises a first and a second position sensor, each having a light source and a light detector separated by an intervening space, wherein the tube or the projection fastened to the tube is capable of moving in said intervening spaces, and wherein said first and second position sensors are arranged at a small mutual distance on either side of the axis about which the tube is moved.

13. A Coriolis flowmeter as claimed in claim 12, characterized in that each tube position sensor comprises a U-shaped tube with two mutually opposed legs, in one of which the light source is present and in the other one of which the light detector is present, wherein a first screen with a first light-transmitting opening is arranged at the side of the light source and a second screen with a light-transmitting opening is arranged at the side of the light detector, wherein said screens of the respective position sensors form part of the legs of a U-shaped structure which is integral for all position sensors, such that the optical axes of the first and the second opening of each position sensor coincide and the optical axes of the respective individual position sensors are mutually parallel.

14. A Coriolis flowmeter as claimed in claim 12, characterized in that a projection is provided at the wall of the flow tube, which projection moves in the light paths of the first and the second position sensor when the tube is moved outside said light paths.

15. A Coriolis flowmeter as claimed in claim 1, characterized in that the flowmeter comprises a first, a second, and a third position sensor, each having a light source and a light detector separated by an intervening space, wherein the tube or a vane fastened to the tube is capable of moving in said intervening spaces, wherein said first and second position sensors are arranged at a small mutual distance on either side of the axis of rotation about which the tube is moved, and wherein the third position sensor is placed next to one of the first and second position sensors in line with the first and second position sensors.

16. A Coriolis flowmeter as claimed in claim 15, characterized in that a projection is provided at the wall of the flow tube, which projection moves in the light paths of the first, the second, and the third position sensor when the tube is moved outside said light paths.

17. A Coriolis flowmeter as claimed in claim 1, characterized in that the tube takes the form of a mechanically closed loop that lies in one plane, wherein the two ends are bent back through the center of the loop such that the ends of the loop act as a resilient suspension.

18. A Coriolis flowmeter as claimed in claim 1, characterized in that the flowmeter is provided with means for exerting a contactless force or torque excitation of the flow tube for the purpose of moving the flow tube.

19. A Coriolis flowmeter as claimed in claim 1, characterized in that a projection is provided on the wall of the flow tube, which projection moves in the light path when the tube is moved outside the light path.

20. A Coriolis flowmeter as claimed in claim 19, characterized in that the projection is provided with at least one opening whose dimension transverse to the direction of movement of the flow tube decreases from wide to narrow, as viewed in the direction of movement of the tube.

21. A Coriolis flowmeter as claimed in claim 19, characterized in that the projection is a vane that is tangentially provided on the tube.

22. The Coriolis mass flowmeter of claim 1, wherein said first and second light-transmitting openings shape the light beam so that non-parallel light is blocked and parallel light is passed.

23. The Coriolis mass flowmeter of claim 1, wherein said first and second openings shape the light beam into a prismatic light beam.

* * * * *